June 30, 1936.　　　　G. HUNTER　　　　2,045,857

LAWN MOWER

Filed Jan. 10, 1935　　　　5 Sheets-Sheet 1

Inventor

G. Hunter.

By Clarence A O'Brien
Attorney

June 30, 1936.  G. HUNTER  2,045,857

LAWN MOWER

Filed Jan. 10, 1935   5 Sheets-Sheet 3

Inventor
G. Hunter
By Clarence A. O'Brien
Attorney

June 30, 1936.  G. HUNTER  2,045,857
LAWN MOWER
Filed Jan. 10, 1935   5 Sheets-Sheet 4

Inventor
G. Hunter
By Clarence A. O'Brien
Attorney

June 30, 1936.  G. HUNTER  2,045,857
LAWN MOWER
Filed Jan. 10, 1935  5 Sheets-Sheet 5

Inventor
G. Hunter

By Clarence A. O'Brien
Attorney

Patented June 30, 1936

2,045,857

UNITED STATES PATENT OFFICE 2,045,857

LAWN MOWER

Gus Hunter, Newport, N. C.

Application January 10, 1935, Serial No. 1,245

4 Claims. (Cl. 56—249)

This invention relates to a lawn mower, the general object of the invention being to provide means for adjusting the various parts thereof to suit the condition of the grass to be cut and the condition of the ground over which the machine is to be operated.

This invention also consists in certain other features of construction and in the combination and arrangement of several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Fig. 5 is a section on line 5—5 of Fig. 1.

Fig. 7 is a section on line 7—7 of Fig. 1.

Fig. 8 is a view looking towards the inner side of one of the wheels.

Fig. 9 is a view looking into the dog carrying member carried by each side member of the frame of the device.

Fig. 10 is a view of one of the members for supporting the drum-carrying shaft, the shaft being shown in section.

Fig. 11 is a fragmentary view of one of the members for swinging the drum-carrying shaft in the arc of a circle, the shaft being shown in section.

Figure 1:
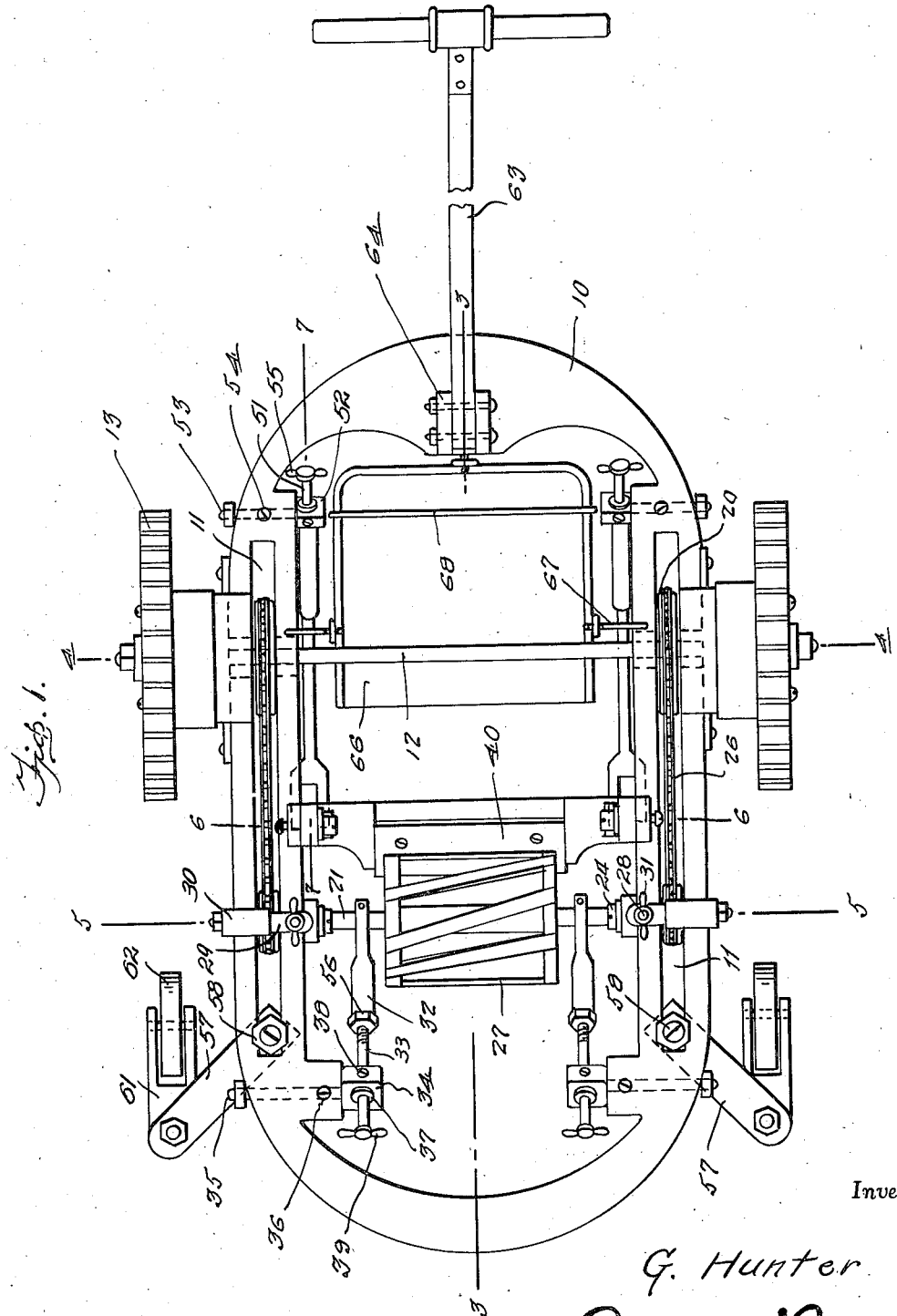
Fig. 1 is a top plan view of the device.
Figure 2:
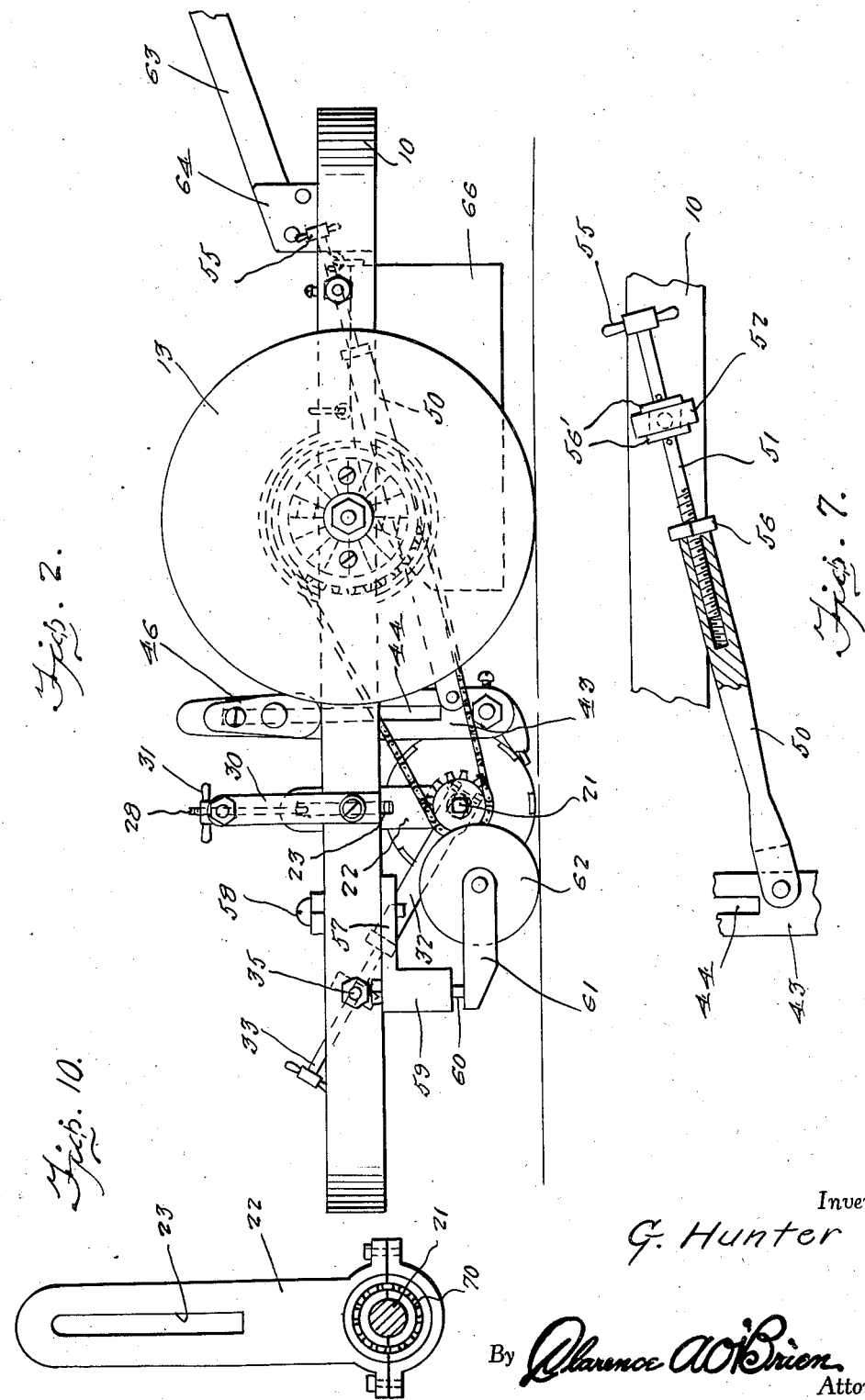
Fig. 2 is a side view thereof.
Figure 3:
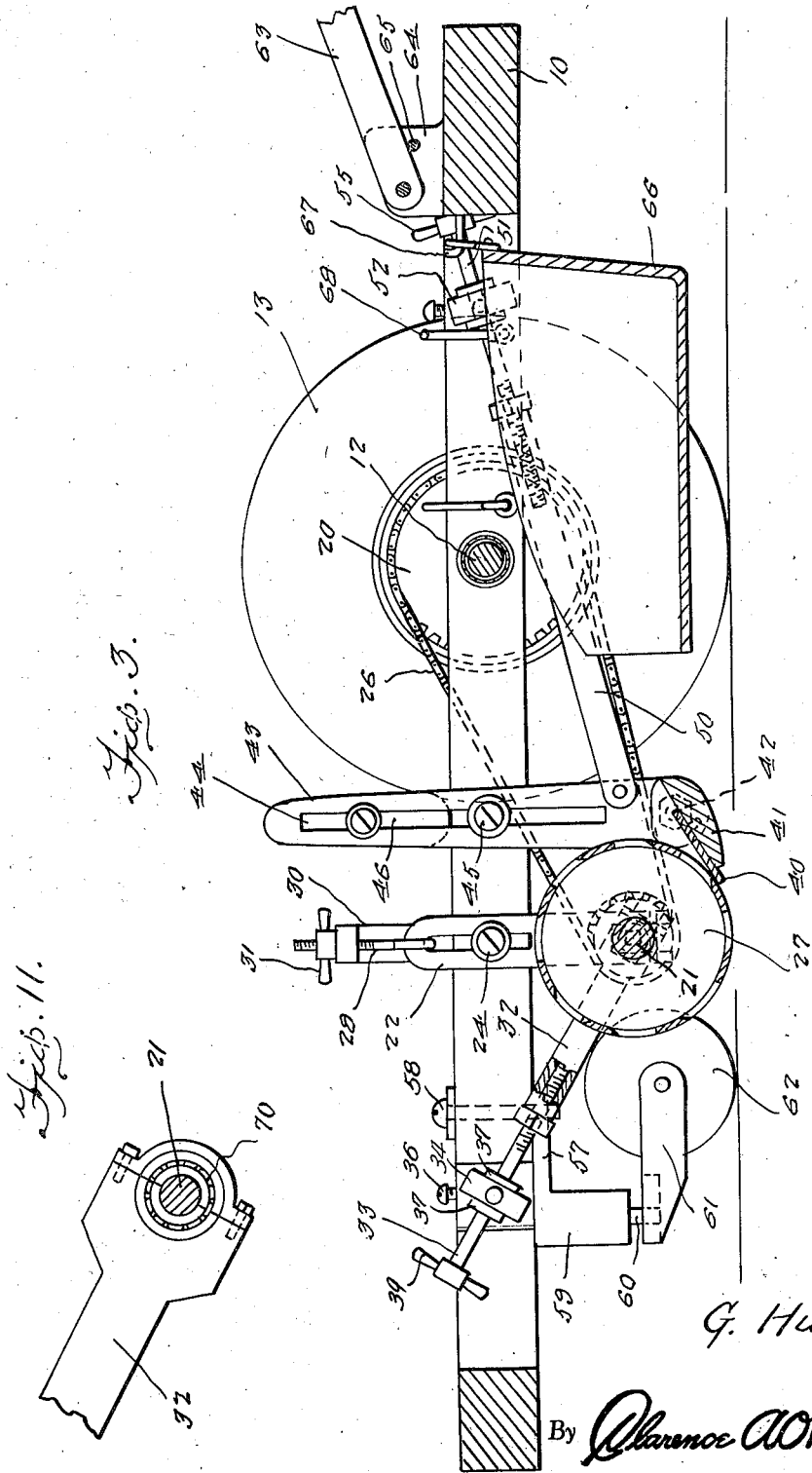
Fig. 3 is a section on line 3—3 of Fig. 1.
Figure 4:
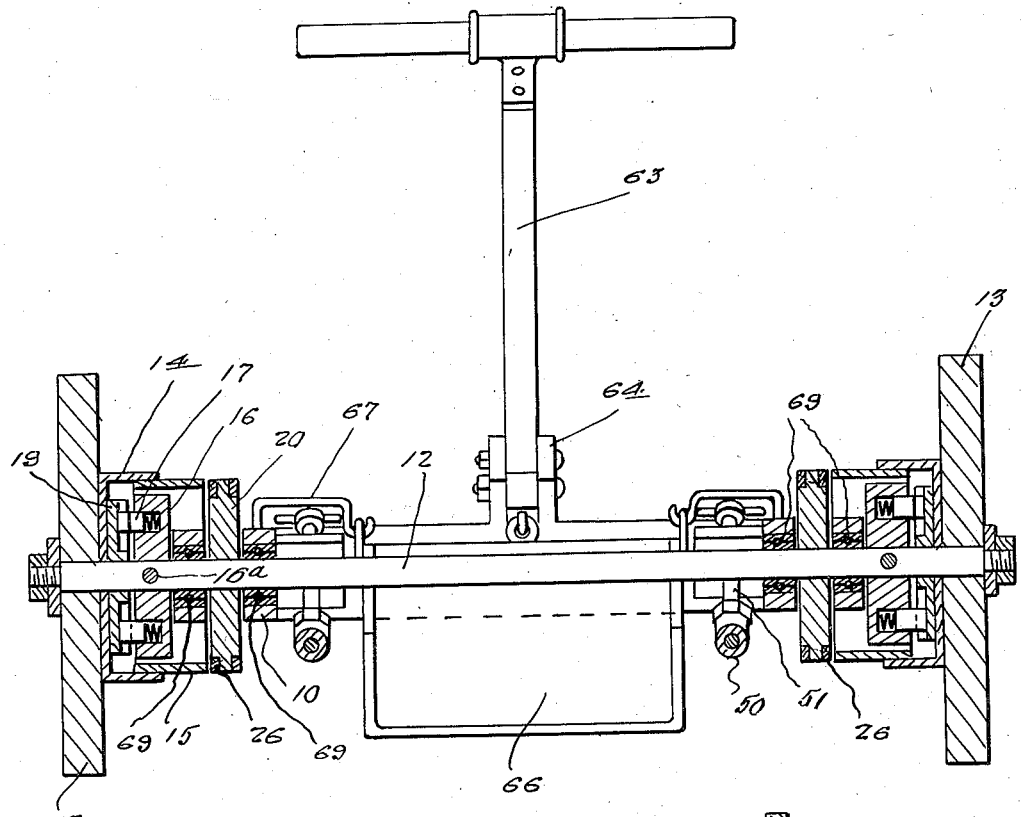
Fig. 4 is a section on line 4—4 of Fig. 1.
Figure 6:
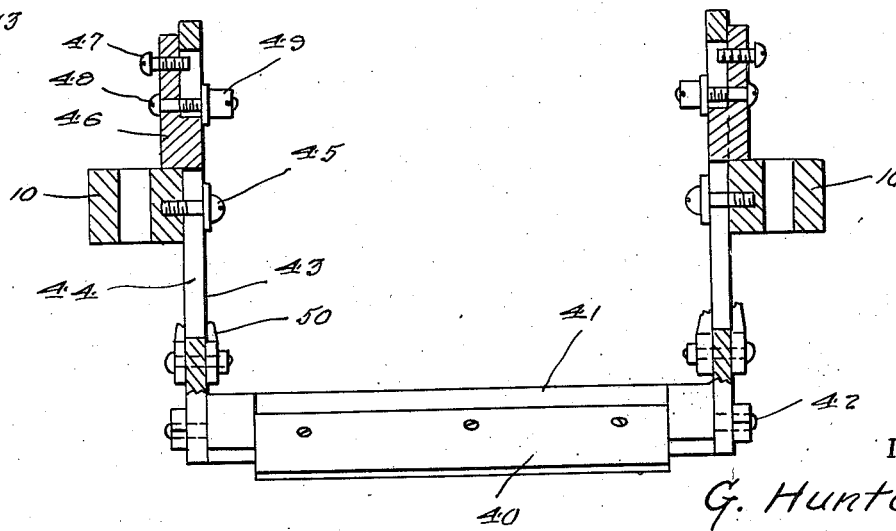
Fig. 6 is a section on line 6—6 of Fig. 1.

In the drawings, the numeral 10 indicates the horizontal frame of the device which has rounded ends and straight parallel side members, each side member having a longitudinally extending slot 11 therein. A shaft 12 is journaled in the rear portions of the side members of the frame and has its ends projecting beyond said side members and each end of the shaft has rotatably mounted thereon a wheel 13 provided with a cup-shaped member 14 on its inner face which overlaps a cylinder 15, the inner end of which is attached to a side member of the frame. A circular member or disk 16 is located in each cylinder 15 and is fastened to the shaft by a pin 16ª and carries a pair of spring dogs 17 for engaging the ratchet member 19 attached to the member 14, these parts being so arranged that as the wheels are rotated by forward movement of the device, the ratchet mechanism will rotate the shaft but as the wheels are rotated in an opposite direction, they will run free on the shaft without rotating the same. A ratchet pulley 20 is fastened to each end part of the shaft and is located in the slot 11 of side members.

A shaft 21 is journaled in the lower end of the slotted members 22, each having a longitudinally extending slot 23 therein through which passes a bolt 24, these bolts entering the side members and a ratchet pulley 25 is fastened to each end of the shaft 21 and chains 26 pass over these pulleys and over the pulleys 20 attached to the shaft 12 so that when the shaft 12 is rotating, the shaft 21 will also be rotating. As shown in Fig. 1, the chains are partly located in the slots 11 of the side members of the frame. The knife-carrying drum 27 is carried by the shaft 21, the blades of this drum cutting the grass in the usual manner when the drum is being rotated.

The shaft 21 with the drum 27 thereon is adapted to be adjusted vertically through means of the hooks 28 passing through the upper ends of the slots 23 of the members 22, the shanks of these hooks passing through the inwardly extending members 29 carried by the uprights 30 and having their upper ends threaded to receive the nuts 31 so that by adjusting these nuts, the hooks can be raised and lowered and thus the members 23 can be raised and lowered in order to adjust the knife-carrying drum relative to the ground. The lower ends of uprights 30 are attached to the sides of frame 10 by screws 30ª.

The drum-carrying shaft 21 can also be swung forwardly or rearwardly through means of the socketed members 32 having their rear ends pivotally connected to the shaft 21 and the sockets of which receive the threaded parts of the screws 33 which pass through the eye members 34 attached to the shanks 35 rotatably arranged in the front portions of the side members of the frame and held in adjusted position by the set screws 36. The screws 33 are held against longitudinal movement by the collars 37 engaging the upper and lower faces of the members 34 and these screws 33 are held in adjusted position by the set screws 38. The upper end of each screw is provided with a handle 39. Thus, it will be seen that by loosening the set screws 36 and the set screws 38 and then turning the screws 33, the members 32 will be moved longitudinally in one direction or the other and this movement will shift the shaft 21 forwardly or rearwardly as the members 22 will swing on the bolts 24, it of course being necessary to loosen the nuts 31 in order to permit this movement of the members 22.

The stationary blade 40 is carried by a horizontal member 41 having trunnions 42 at its ends which are mounted in the depending members 43, each of which has a longitudinally extending slot 44 therein through which passes a screw 45, the screw passing into a side member of the frame and these members 43 can be raised and lowered to adjust the height of the stationary blade from the ground by means of the rockers 46 having their rounded lower ends contacting the upper edges of the side members of the frame, each rocker having a part extending into the slot 44 of the member 43 and a screw 47 also extending into the slot and a second screw 48 passing through each rocker member into the slots and has a clamping nut 49 on its inner end for clamping the parts in adjusted position. Screw 47 limits the downward movement of the members 43 and prevents cutter blade 40 from dragging on the ground at its lowermost position.

This stationary blade can also be swung forwardly and rearwardly by means of the socketed members 50 pivotally connected to the members 43 and the bolts 51 threaded in the sockets of the members 50 and passing through the eye members 52 carried by the shanks 53 rotatably arranged in the rear ends of the side members and held in adjusted position by the set screws 54. The rear end of each bolt 51 is formed with a handle 55 and each of these bolts 51 and the bolts 33 are locked in adjusted position by the nuts 56 as more clearly shown in Fig. 7. The bolts 51 are also prevented from having longitudinal movement with the eye members 52 by the collars 56'.

A horizontal arm 57, one for each side of the frame 10 has the inner end held in adjustable relation against the bottom of the side of the frame by a bolt 58, the shank of which passes through the slot 11 and each arm has a vertically arranged bearing member 59 on its outer end for the trunnions 60 of a fork 61 which carries a small front wheel 62. Thus, the fork would pivot on the part 59 so that these wheels 62 act somewhat like caster wheels and they can be adjusted forwardly or rearwardly as desired.

A handle 63 is pivoted between the upstanding ears 64 at the rear of the frame, a pin 65 limiting downward movement of the handle when the same is in operative position, it being seen that the handle can be folded or swung forwardly over the frame when not in use.

A pan 66 for catching the grass cut by the device is suspended from the rear part of the main frame by the three hooks 67, the pan being provided with a bail 68 for enabling it to be removed from the hooks and transported from one place to another.

Thus, it will be seen that I have provided a lawn mower which is very easy to operate and guide and one in which the blade-carrying drum and the stationary knife can be raised and lowered and moved forwardly and rearwardly to suit the condition of the grass being cut and the ground over which the device is being operated.

It will also be seen that when the device is being moved forwardly, the wheels 13 will rotate the shaft 12 which in turn rotates the blade-carrying shaft but when the device is moved rearwardly, the wheels 13 simply rotate on the shaft 12 without revolving the same and this arrangement also permits the device to be turned easily and on a short curve.

Ball bearings are provided for the wheel-carrying shaft 12 where it passes through the side members of the frame as shown generally at 69 and ball bearings, as shown generally at 70, are provided on the drum-carrying shaft 21 where it passes through the members 22 and the members 32, these bearings being shown more particularly in Figs. 10 and 11 and I prefer to make the ends of the drum-carrying shaft 21 square in cross section to fit in square holes in the ratchet pulleys 25, any suitable means being used to hold the pulleys in place.

It is thought from the foregoing description that the advantages and novel features of the invention will be readily apparent.

It is to be understood that changes may be made in the construction and in the combination and arrangement of the several parts, provided that such changes fall within the scope of the appended claims.

I claim:

1. In a lawn mower, a horizontal frame including a pair of laterally spaced side members, a pair of vertically arranged longitudinally slotted bars, one bar being arranged adjacent one side member and the other adjacent the other side member, bolts passing through the slots in the side bars and through the side members of the frame for supporting the bars for vertical movement in the frame, a cutter reel shaft having its ends journaled in the lower ends of said bars a member swiveled in the frame, a sectional member, one section having a threaded socket therein and the other having a threaded portion fitting in the socket, the outer end of one section being connected with the shaft and the other section passing through the swiveled member and rotating therein whereby turning movement of the last-mentioned section will rock the bars on the bolts for adjusting the cutter reel shaft forwardly or rearwardly.

2. In a lawn mower, a horizontal frame including a pair of laterally spaced side members, a pair of substantially vertically arranged longitudinally slotted bars, one bar being arranged adjacent one side member and the other adjacent the other side member, bolts passing through the slots in said bars and through the side members of the frame for supporting the bars for vertical movement in the frame, a cutter bar member supported from the lower ends of the bars, a member swiveled in the frame, a sectional member, one section of which has a threaded socket therein and the other having a threaded portion fitting in the socket, the other end of one section being connected with the bars and the other section passing through the swiveled member and rotating therein whereby turning movement of the last-mentioned section will rock the bars on the bolts for adjusting the cutter-bar member forwardly or rearwardly.

3. In a lawn mower, a horizontal frame including a pair of laterally spaced side members a pair of vertically arranged bars, one contacting one side member and the other contacting the other side member, said bars having longitudinally extending slots therein, bolts passing through the slots and side members of the frame for permitting the bars to be adjusted vertically, a second pair of vertically arranged bars one contacting one side member and the other contacting the other side member, said bars having longitudinally extending slots therein, bolts passing through the slots of the last-mentioned bars and side members of the frame, a cutter reel shaft journaled in the lower ends of the first pair of bars, a cutter bar member supported from the lower ends of the second pair of bars, a member swiveled in the front part of the frame, an elongated member composed of a pair of sections one section having a threaded socket therein and the other section having a threaded portion fitting in the socket, one section passing for rotary movement through the sweveled member on the front of the frame and the other section being connected with the shaft, a second member swiveled in the rear part of the frame, a second elongated member composed of a pair of sections, one having a threaded socket therein and the other section having a threaded portion fitting in the socket, one of the last-mentioned sections passing for rotary movement through the second swiveled member at the rear of the frame and the other of the last-mentioned sections being connected to one of the second pairs of bars.

4. In a lawn mower of the class described, a horizontal frame including laterally spaced side members, a shaft journaled in the frame, wheels carried by the shaft, a pair of vertically arranged and laterally spaced bars having longitudinally extending slots therein, bolts passing through the slots into the side members of the frame, a cutter reel shaft journaled in the lower ends of the bars for supporting a cutter reel, a second pair of vertically arranged and laterally spaced bars having longitudinally extending slots therein, bolts passing through the slots into the side members of the frame, a cutter bar member supported from the lower ends of the second pair of bars for coacting with the cutting knives in cutting grass, and means including a flexible endless member for connecting the wheel-carrying shaft with the cutter reel shaft.

GUS HUNTER.